(12) United States Patent
Samejima

(10) Patent No.: US 9,124,752 B2
(45) Date of Patent: Sep. 1, 2015

(54) ACTIVATION OF FUNCTIONS IN A MULTI-FUNCTIONAL APPARATUS ON DEMAND

(71) Applicant: Hiroshi Samejima, Guttenberg, NJ (US)

(72) Inventor: Hiroshi Samejima, Guttenberg, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/025,368

(22) Filed: Sep. 12, 2013

(65) Prior Publication Data

US 2015/0070718 A1     Mar. 12, 2015

(51) Int. Cl.
*G06F 3/12* (2006.01)
*H04N 1/00* (2006.01)

(52) U.S. Cl.
CPC ......... *H04N 1/00973* (2013.01); *H04N 1/0035* (2013.01)

(58) Field of Classification Search
CPC ..... G06F 21/121; G06F 21/10; G06F 21/629; G06F 11/30; G06F 17/30082; G06F 21/125; G06F 21/577; G06F 21/6218; G06F 2221/033; G06F 2221/034; G06F 9/45558
USPC .................................................. 358/1.15, 1.1
See application file for complete search history.

(56) References Cited

U.S. PATENT DOCUMENTS

2006/0209337 A1*  9/2006  Atobe et al. ................. 358/1.15
2012/0127509 A1*  5/2012  Faber ........................... 358/1.14

* cited by examiner

*Primary Examiner* — Martin Mushambo
(74) *Attorney, Agent, or Firm* — Cooper & Dunham LLP

(57) ABSTRACT

Systems, apparatuses and methods are provide to allow a multi-functional apparatus to be configured on user side, as needed. Functions are activated on demand, and user is charged an amount corresponding to the functions and/or settings that the user requests.

20 Claims, 26 Drawing Sheets

| Cost Table for Copy/Print Job | | | |
|---|---|---|---|
| Configuration | Mode | Mode Cost | Cost Per Page |
| Speed | Super H | $ 5.00 | n/a |
| | High | $ 2.00 | n/a |
| | Medium | $ 1.00 | n/a |
| | Standard | $ 0.00 | n/a |
| Color | Color | $ 0.07 | $ 1.00 |
| | Gray Scale | $ 0.05 | $ 0.50 |
| | Black & White | $ 0.03 | $ 0.25 |
| Paper Size | A3 | $ 0.15 | $ 0.75 |
| | B2 | $ 0.13 | $ 0.50 |
| | A4 | $ 0.02 | $ 0.12 |
| | 8.5 x 11 | $ 0.02 | $ 0.10 |
| Paper Output | 1 Sided | $ 0.10 | $ 0.25 |
| | 2 Sided | $ 0.07 | $ 0.10 |
| | Duplex | $ 0.05 | $ 0.05 |

Fig. 5A

| Cost Table for Facsimile | | | |
|---|---|---|---|
| Configuration | Mode | Mode Cost | Cost Per Page |
| Line | International | $ 3.00 | $ 1.00 |
| | Domestic | $ 1.00 | $ 0.50 |
| Service | Phone | $ 0.75 | n/a |
| | Internet | $ 0.50 | n/a |
| Destination | Fax Number | $ 2.00 | $ 0.25 |
| | E-Mail Address | $ 0.10 | $ 0.05 |

Fig. 5B

| Cost Table for Scanning |||||
|---|---|---|---|
| Configuration | Mode | Mode Cost | Cost Per Page/ 100 kilobyte |
| Color | Color | $ 0.07 | $ 1.00 |
|  | Gray Scale | $ 0.05 | $ 0.50 |
|  | Black & White | $ 0.03 | $ 0.25 |
| PPI | 600 | $ 0.10 | $ 0.30 |
|  | 300 | $ 0.08 | $ 0.23 |
|  | 150 | $ 0.06 | $ 0.13 |
|  | 70 | $ 0.03 | $ 0.08 |
| Destination | E-Mail | $ 0.04 | $ 0.05 |
|  | Network Drive | $ 0.03 | $ 0.03 |
|  | External Storage | $ 0.02 | $ 0.02 |
|  | PC | $ 0.01 | $ 0.01 |
| Output File Format | JPEG | $ 0.11 | $ 0.05 |
|  | GIF | $ 0.09 | $ 0.04 |
|  | PNG | $ 0.05 | $ 0.03 |
|  | PDF | $ 0.04 | $ 0.02 |

Fig. 5C

| Role Information for Accessing Copy/Print Functions ||||| 
|---|---|---|---|---|
| Role | Speed | Color | Paper Size | Paper Output |
| Administrator | Super H<br>High<br>Medium<br>Standard | Color<br>Gray Scale<br>Black & White | A3<br>B2<br>A4<br>8.5 x 11 | 1 Sided<br>2 Sided<br>Duplex |
| Power User | High<br>Medium<br>Standard | Gray Scale<br>Black & White | B2<br>A4<br>8.5 x 11 | 1 Sided<br>2 Sided<br>Duplex |
| Advance User | Medium<br>Standard | Gray Scale<br>Black & White | A4<br>8.5 x 11 | 1 Sided<br>2 Sided<br>Duplex |
| Basic User | Standard | Black & White | A4<br>8.5 x 11 | 1 Sided<br>2 Sided<br>Duplex |
| Guest User | Standard | Black & White | 8.5 x 11 | 2 Sided<br>Duplex |

Fig. 6A

| Role Information for Accessing Scan Functions ||||| 
|---|---|---|---|---|
| Role | DPI | Color | Destination | Paper Output |
| Administrator | 600<br>300<br>150<br>70 | Color<br>Gray Scale<br>Black & White | E-mail<br>Network Drive<br>External Storage<br>PC | PDF<br>JPEG<br>GIF<br>PNG |
| Power User | 150<br>70 | Color<br>Gray Scale<br>Black & White | E-mail<br>Network Drive<br>External Storage<br>PC | PDF<br>GIF<br>PNG |
| Advance User | 150<br>70 | Color<br>Gray Scale<br>Black & White | E-mail<br>Network Drive<br>PC | PDF<br>GIF |
| Basic User | 70 | Gray Scale<br>Black & White | Network Drive<br>E-mail | PDF |
| Guest User | 70 | Black & White | E-mail | PDF |

Fig. 6B

| Role Information for Accessing Fax Functions ||||
|---|---|---|---|
| Role | Line | Service | Destination |
| Administrator | International<br>Domestic | Phone<br>Internet | Fax No.<br>E-mail Address |
| Power User | International<br>Domestic | Phone<br>Internet | Fax No.<br>E-mail Address |
| Advance User | Domestic | Phone<br>Internet | Fax No.<br>E-mail Address |
| Basic User | Domestic | Internet | E-mail Address |
| Guest User | Domestic | Internet | E-mail Address |

Fig. 6C

Please Login

Username: Shark

Login Using ID Card

Password: ********

Fig. 8A

Please Select Job Type

- Copy ($2.00)
- Fax ($4.00)
- Admin
- Print ($1.00)
- Scan ($0.50)
- Job History User ID: Shark
Remaining: $567.00

Fig. 8B

| Change to Alternative Settings? | Job Type: Copy ($2.00) |
|---|---|
| Default Settings | Setting Cost |
| Speed: Standard ($0.00) | $5.00 |
| Color: Black & White ($0.25/page) | $0.03 |
| Paper Size: 8.5 x 11 ($0.10/page) | $0.02 |
| Paper Output: Duplex ($0.05/page) | $0.05 |

User ID: Shark

Remaining: $567.00

[Change] [No]

Fig. 8C

Please Select Settings — Job Type: Copy ($2.00)

Speed
- ■ Super H ($5.00)
- ☐ High ($2.00)
- ☐ Medium ($1.00)
- ☐ Standard ($0.00)

Color
- ☐ Color ($1.00/page)
- ☐ Gray Scale ($0.50/page)
- ■ Black & White ($0.25/page)

Paper Size
- ☐ A3 ($0.75/page)
- ☐ B2 ($0.50/page)
- ■ A4 ($0.12/page)
- ☐ 8.5 x 11 ($0.10/page)

Paper Output
- ☐ 1 Sided ($ 0.25/page)
- ■ 2 Sided ($ 0.10/page)
- ☐ Duplex ($ 0.05/page)

Job: Copy 1

User ID: Shark

Remaining: $567.00

[Cancel] [Confirm]

Fig. 8D

| Please Review Your Selections | Job Type: Copy ($2.00) |
|---|---|
| Settings | Setting Cost |
| Speed: Super H ($5.00) | $5.00 |
| Color: Black & White ($0.25/page) | $0.03 |
| Paper Size: A4 ($0.12/page) | $0.02 |
| Paper Output: Duplex ($0.05/page) | $0.05 |

Job: Copy 1

User ID: Shark

Remaining: $567.00

[Back] [Confirm]

Fig. 8E

Input Activation Code — Job Type: Copy ($2.00)

Please input the activation code.

COPY8874

Job: Copy 1

User ID: Shark

Remaining: $567.00

[Back] [Copy]

Fig. 8F

| Please Select a Print Job | Job Type: Print ($1.00) |
|---|---|
| Documents | Pages |
| ■ Marketing.pdf | 20 |
| ☐ Presentation.ppt | 14 |
| ☐ FiscalReport.doc | 152 |
| ☐ Finance.xlsx | 6 |
| ☐ Notes.txt | 1 |

User ID: John

Remaining: $985.00

[Cancel] [Confirm]

Fig. 10A

| Please Review Your Selections | | Job Type: Print ($1.00) |
|---|---|---|
| Settings | Settings Cost | Subtotal |
| Printing | $1.00 | $1.00 |
| Speed: Standard | $0.00 | $0.00 |
| Color: Color ($1.00/page) Black & White ($0.25/page) | $0.07 | $12.57 |
| Paper Size: 8.5 x 11 ($0.10/page) | $0.02 | $2.02 |
| Paper Output: 1 Sided ($0.25/page) | $0.10 | $5.10 |
| | | Total: $20.69 |

Job: Marketing.pdf

Pages (Color): 10
Pages (B&W): 10
Total Pages: 20

User ID: John

Remaining: $985.00

[Back] [Print]

Fig. 10B

| Please Select Settings | Job Type: Scan ($0.50) | Job: Scan 2 |

PPI
- ■ 600 ($0.30/page)
- ☐ 300 ($0.23/page)
- ☐ 150 ($0.13/page)
- ☐ 70 ($0.08/page)

Color
- ☐ Color ($1.00/page)
- ☐ Gray Scale ($0.50/page)
- ■ Black & White ($0.25/page)

Destination
- ■ E-mail ($0.05/100 KB)
- ☐ Net. Drive ($0.03/100 KB)
- ☐ Ext. Storage ($0.02/100 KB)
- ☐ PC ($0.01/100 KB)

Output File Format
- ☐ JPEG ($0.05/page)
- ☐ GIF ($0.04/page)
- ☐ PNG ($0.03/page)
- ■ PDF ($0.02/page)

User ID: Carol

Remaining: $355.00

[Cancel] [Confirm]

Fig. 12A

Please Input Destination     Job Type: Scan ($0.50)

E-mail Address

Carol.Hawkins@Ricoh-usa.com

Job: Scan 2

User ID: Carol

Remaining: $355.00

[Back] [Confirm]

Fig. 12B

| Please Select Settings | Job Type: Fax ($4.00) | Job: Fax 1 |

Line
■ International ($1.00/page)
☐ Domestic ($0.50/page)

Service
■ Phone ($0.75)
☐ Internet ($0.50)

Destination
■ Fax Number ($0.25/page)
☐ E-mail ($0.05/page)

User ID: Fred

Remaining: $657.00

[Cancel] [Confirm]

Fig. 14A

Please Input Destination     Job Type: Fax ($4.00)     Job: Fax 1

Fax No. (International)

011-81-3-123-4567

User ID: Fred

Remaining: $657.00

[Back] [Confirm]

Fig. 14B

| Please Review Your Selections | Job Type: Fax ($4.00) | Job: Fax 1 |

Fax No.: 011-81-3-123-4567

| Settings | Settings Cost |
|---|---|
| Fax | $4.00 |
| Line: International ($1.00/page) | $3.00 |
| Service: Phone ($0.75) | $0.75 |
| Destin: Fax No. ($0.25/page) | $2.00 |

User ID: Fred

Remaining: $657.00

[Back] [Confirm]

Fig. 14C

Faxing ...　　　　　Job Type: Fax ($4.00)　　　　Job: Fax 1

Fax Successful

You have faxed 6 pages to 011-81-3-123-4567. A total of $17.25 has been charged to your account. You have $639.75 remaining. Would you like to fax another document?

User ID: Fred

Remaining: $643.57

[Back] [Yes]

Fig. 14D

ACTIVATION OF FUNCTIONS IN A MULTI-FUNCTIONAL APPARATUS ON DEMAND

TECHNICAL FIELD

This disclosure relates to tools (such as systems, apparatuses, methodologies, computer program products, etc.) for authorizing and activating functions in a multi-functional apparatus, and more particularly, for authorizing and activating functions in a multi-functional apparatus upon demand.

BACKGROUND

In the current information age, information technology (IT) tools play a significant role in our daily activities, and there are often discussions of the desirableness of a paperless society. However, notwithstanding such discussions, there remains a need by users of computers and other information terminals (that is, any of the various conventional devices which have a need to print on demand, such as personal computers, notebook computers, workstations, other types of computers, kiosks, PDAs, other information appliances, etc.) for printing functionality. Therefore, devices having printing or plotting functionality, such as printers, copiers, multi-function devices, etc., continue to play a significant role at home, at work and even elsewhere.

As multi-functional printers (MFP) become a more integral part of the working environment, their demand has soared. Suppliers are producing a variety of MFPs with various features in order to meet this new need. New product models may be designed to enhance the rate at which printing is performed, while others are designed to give the highest quality in scanning images. Due to this proliferation of different services, users who purchase these MFPs are often at a loss as to which model is the best suited. Further, once a model is purchased, the user cannot readily add additional features to the purchased model which forces the user to purchase a new MFP.

There remains a need for an improved approach that allows users to readily access features that can be provided by an MFP, in a more convenient manner to users.

SUMMARY

Various tools (for example, a system, an apparatus, application software, etc.) can be configured to authorize and activate functions in a multi-functional printer (MFP), in the manner described in this disclosure. Such tools facilitate a new business process for sale and use of multi-function devices. That is, whereas conventional business models require the MFP customer to buy, and pay for, a multi-function device according to desired functions and features determined and specified in advance, the tools disclosed herein allow the customer to obtain the benefit of such functions and features, on demand, without having paid, at a high upfront price, for a full-feature or full-function device. Instead, the device supplier recovers revenue upon use of said functions or features, as the customer is charged per use of such functions or features. The charges may be supplemented by charges for changing default settings to user-specified settings, and performing a job based on the user-specified settings.

In an aspect of this disclosure, a multi-functional printer is configured to include all of the operation units that are needed for the functions and features that a user may want or need. Such operation units may be configured by software and at least some of the software may be activated (and/or downloaded) only upon demand. For example, when the MFP receives a user request to perform a specified function (copying, printing, scanning, faxing, etc.), the MFP sends to a software authorization apparatus a request and a code. When the code is validated, the software authorization apparatus permits the MFP to perform the specified function. In addition to activation of software upon code validation, one or more of the operation units may be activated only upon demand as well. The MFP can then proceed to perform the specified function and charge the user an amount corresponding to the user-requested function which has been performed.

In another aspect, in a case that the multi-functional printer (MFP) does not contain the software required to perform the specified function, the MFP sends a request accompanied by a code supplied by the user to a software supplying apparatus. When the code is validated, the software supplying apparatus permits the MFP to download the required software and perform the specified function. The MFP then performs the specified function and charges the user an amount corresponding to the specified function and removes the software.

In another aspect, a device management apparatus is provided to manage devices in a networked system, and the software supplying apparatus may communicate with the device management apparatus, in order to obtain the benefit of the device data maintained by the device management apparatus. For example, the device management apparatus can determine based on the user credentials the devices and functions that the user is authorized to use, and sending this information to the software supplying apparatus.

The aforementioned aspects enable a business model in which a supplier only needs to maintain a limited number of models of a device in its product line, and each device unit amongst the limited number of models is configurable by software to provide a large number of functions and features (in addition to the base functions and features), upon demand. In such new business model, the supplier or manufacturer need not maintain as many different sets of resources to market a large number of respective device models, since only a few device models will need to be maintained. In terms of cost recovery, the upfront price can be set for cost recovery while additional revenues can be collected upon use of functions and features upon user demand.

BRIEF DESCRIPTION OF THE DRAWINGS

The aforementioned and other aspects, features and advantages can be more readily understood from the following detailed description with reference to the accompanying drawings wherein:

FIGS. 5A-5C show examples of cost information for a copy/print job, scan job and fax job, respectively.

FIGS. 6A-6C show examples of user role information, such as maintained by the device management apparatus shown in FIG. 1C;

FIG. 8A-8G show examples of user interface screens displayed on a terminal, according to any of the exemplary embodiments shown in FIGS. 1A-1C;

FIGS. 10A and 10B show examples of user interface screens displayed on a terminal, according to any of the exemplary embodiments shown in FIGS. 1A-1C;

FIG. 12A-12C show examples of user interface screens displayed on a terminal, according to any of the exemplary embodiments shown in FIGS. 1A-1C;

FIG. 14A-14E show examples of user interface screens displayed on a terminal, according to any of the exemplary embodiments shown in FIGS. 1A-1C;

DETAILED DESCRIPTION

Figure 1A:
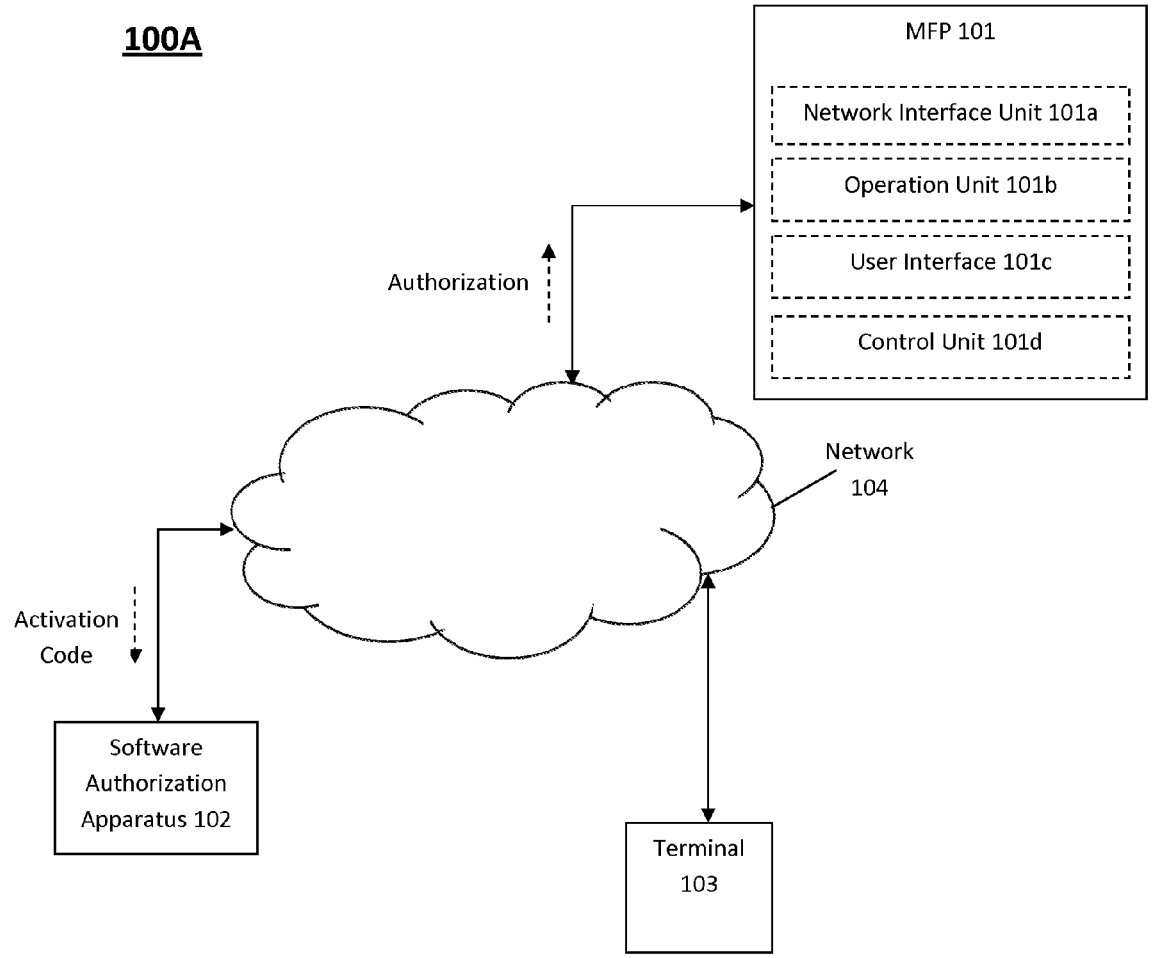
FIG. 1A shows a block diagram of a system for authorizing and activating functions in a multi-functional apparatus, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (systems, apparatuses, methodologies, computer program products, etc.) for authorizing and activating functions in a multi-functional apparatus.

FIG. 1A shows schematically a system 100A that includes, all of which are interconnected by network 104, a multi-functional printer 101, a software supplying apparatus 102 and a terminal 103.

Figure 4:
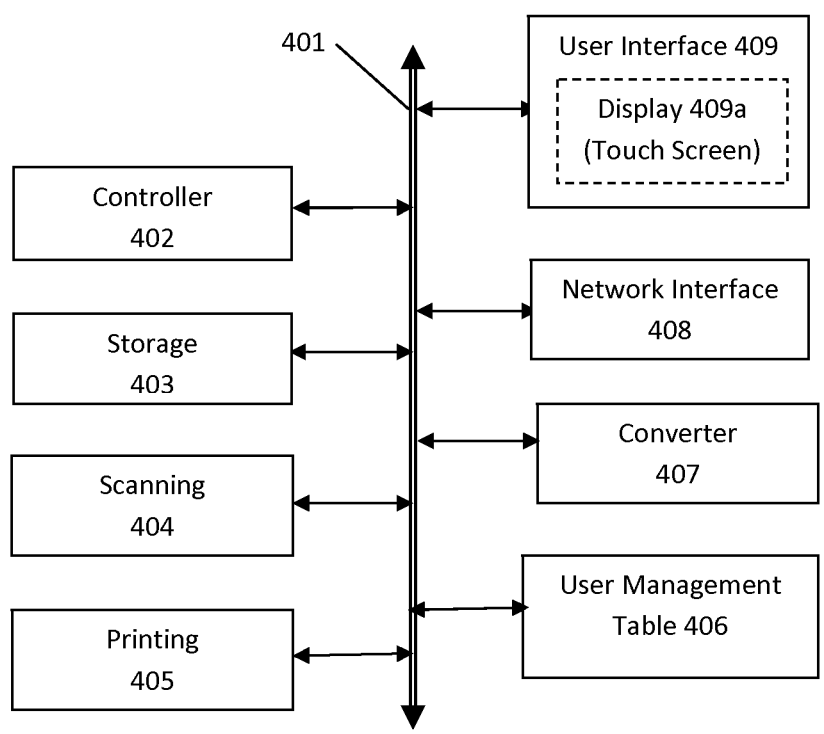
FIG. 4 shows a block diagram of an exemplary configuration of a multi-function device.

The MFP 101 can be, for example a printer/scanner, printer/scanner/fax, etc. Ideally, the MFP 101 contains all of the above-mentions functions, but may not necessarily be allowed to perform the functions immediately. For example, the MFP 101 may have a plurality of inactive software which corresponds to a different set of functions (copying, printing, scanning, faxing). Authorization from an external device may be required before the MFP 101 can perform such functions. While this example of this disclosure simply refers to a single MFP 101 in the interest of brevity, it should be appreciated that the network environment can have an arbitrary number of MFP devices. The MFP 101 may be configured as shown in FIG. 4, which is discussed infra.

The network interface unit 101a allows the MFP 101 to communicate through the network 104, such as with the software supplying apparatus 102 and the terminal 103. The network interface unit 101a is configured to communicate with any particular device amongst plural heterogeneous devices that may be included in the system 100A in a communication format native to the particular device. The network interface unit 101a may determine an appropriate communication format native to the particular device by any of various known approaches. For example, the network interface unit 101a may refer to a database or table, maintained internally or by an outside source, to determine an appropriate communication format native to the device. As another example, the network interface unit 101a may access an Application Program Interface (API) of the particular device, in order to determine an appropriate communication format native to the device.

The MFP 101 includes an operation unit 101b which is a combination of firmware and hardware that allows the MFP 101 to perform a function (copying, printing, scanning, faxing, etc.). While only one operation unit 101b is shown in FIG. 1A in the interest of brevity, it should be appreciated that the MFP 101 can have an arbitrary number of operation units 101b. For example, one type of operation unit 101b can be used for copying files, while another type of operation unit 101b can be used for faxing documents. Further, software can be used to cause the operation unit 101b to perform and configure the functions. For example, the MFP may contain a capability for scanning documents, but users are not able to access that function until software for scanning is installed onto the MFP 101. Further, even if the MFP contained the software for scanning, users may still not be able to access it. For example, the MFP 101 may have to receive authorization from an external device, such as the software authorization apparatus 102, before giving the user the privilege of scanning.

The user interface 101c allows the user to access various functions on the MFP 101. For example, the user may operate the user interface 101c on the MFP 101 to copy a document, scan a photo, print from a PC or fax to another country. Such access to the functions in the MFP may require the user to input user credentials through the user interface 101b. The user interface may include a graphical user interface through which the user enters username, password, etc. However, user credentials may alternatively or additionally include other information. For example, the user interface may include, or may be integrated with, components for speech processing, voice recognition, fingerprint scanning, facial recognition, retina scanning, other forms of biometric authentication, etc. In addition, the user may also have to present an activation code before accessing the functions of the MFP 101. The activation code may be in the form of the user credentials inputted earlier. However, the activation code may also include inputting an alphanumeric sequence, swiping an ID card, etc. Such components, like the user interface 101b, can include a combination of software and hardware components. Since such provisions are well known in the art, and do not form an inventive aspect of this disclosure, details thereof are not provided herein in order to avoid obscuring the inventive aspects of this disclosure.

The control unit 101d determines the functions the user has access to. When the user selects a function and enters an activation code on the MFP 101, the control unit 101d sends, through network interface unit 101a, the activation code to the software authorization apparatus 102. The software authorization apparatus 102 then determines if the function is available to the user based on the validity of the activation code. In the case that the user is able to access that function, the control unit 101d receives authorization to activate the software to cause that function to be performed. Otherwise, the user is not permitted to access that function on the MFP 101.

The software authorization apparatus 102 authorizes the MFP 101 to activate software which was previously inactive in the MFP 101. For example, when a user wants to perform a job (copy, printing, scanning, faxing, etc.) on the MFP 101, the user inputs an activation code which is sent by the MFP 101 to the software authorization apparatus 102. If the activation code is valid, the software authorization apparatus 102 communicates with the MFP 101 authorizing the MFP 101 to perform the job. Otherwise, if the activation code is not valid, the MFP 101 does not authorize the MFP 101 to perform the job. The software authorization apparatus 102 is further described infra with reference to FIG. 2.

The terminal 103 can be any computing device, including but not limited to a personal, notebook or workstation computer, a kiosk, a PDA (personal digital assistant), a mobile phone or handset, another information terminal, etc., that can communicate with other devices through the network 104. Although only one user terminal is shown in FIG. 1A, it should be understood that the system 100A can include a plurality of user terminal devices (which can have similar or different configurations). The terminal 103 is further described infra with reference to FIG. 3.

The network 104 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 103. In addition, the network 103 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
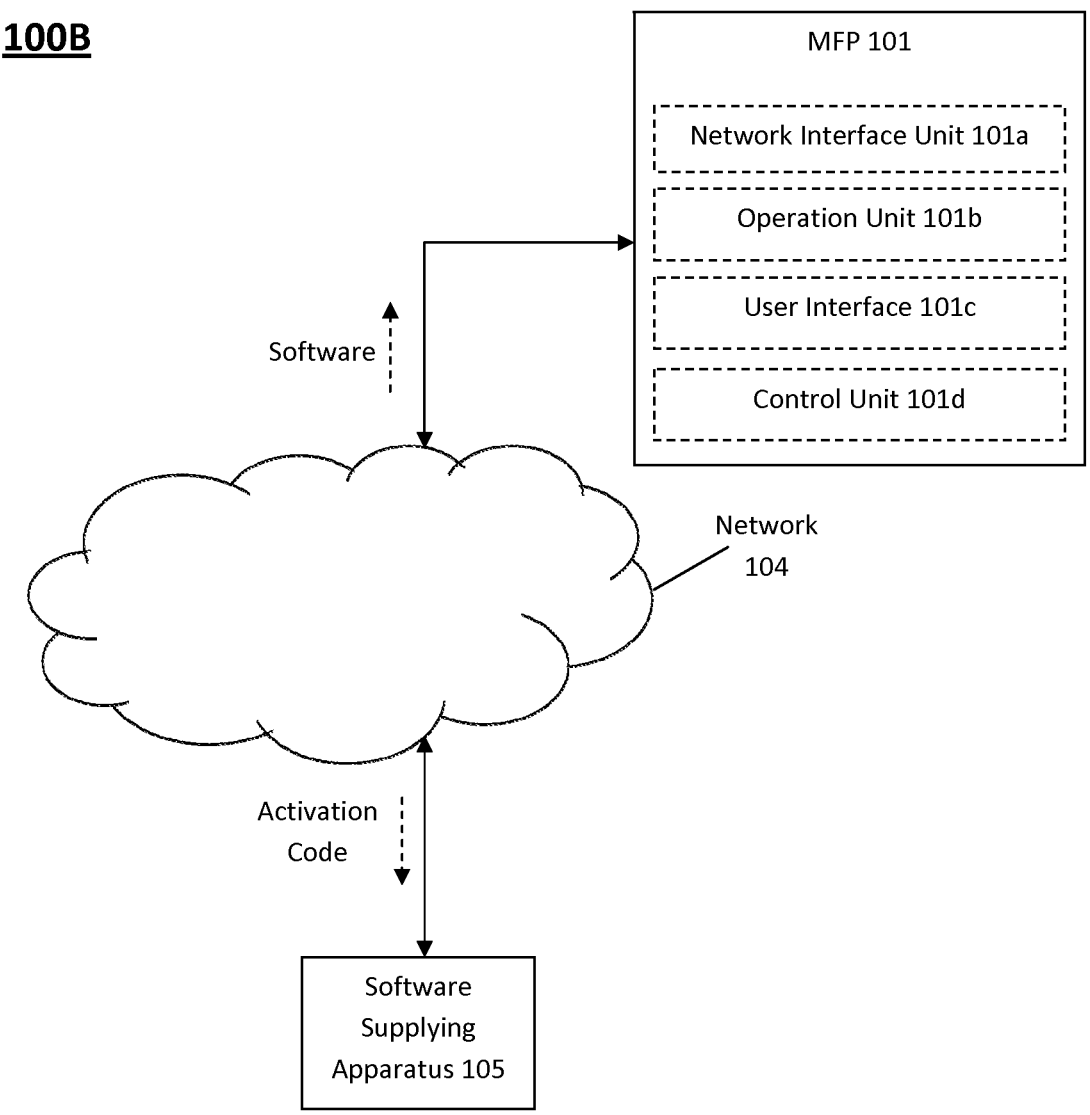
FIG. 1B shows a block diagram of a system for authorizing and activating functions in a multi-functional apparatus, according to another exemplary embodiment.

FIG. 1B shows schematically a system 100B, according to another exemplary embodiment. The system 100B is similar to the system 100A except that the system additionally includes a software supplying apparatus 105.

The software supplying apparatus 105 is connected to network 104, and stores software that is used for configuring functions on the MFP 101. In this case, the MFP 101 has no pre-installed software and must download such software from another location (e.g. the software supplying apparatus 105) in order to perform functions such as copying, printing, scanning, faxing, etc. The software supplying apparatus 105 typically sends the software to the MFP 101 when requested. However, before sending the software, the software supplying apparatus 105 must verify whether the activation code which accompanied the request is valid. In the case that the activation code is validated, the software supplying apparatus 105 sends the software to the MFP 101. Otherwise, the software is not sent. The software authorization apparatus 102 is further described infra with reference to FIG. 2.

Otherwise, operations of the elements of the system 100B are similar to those discussed in connection with the corresponding elements of the system 100A of FIG. 1A.

Figure 1C:
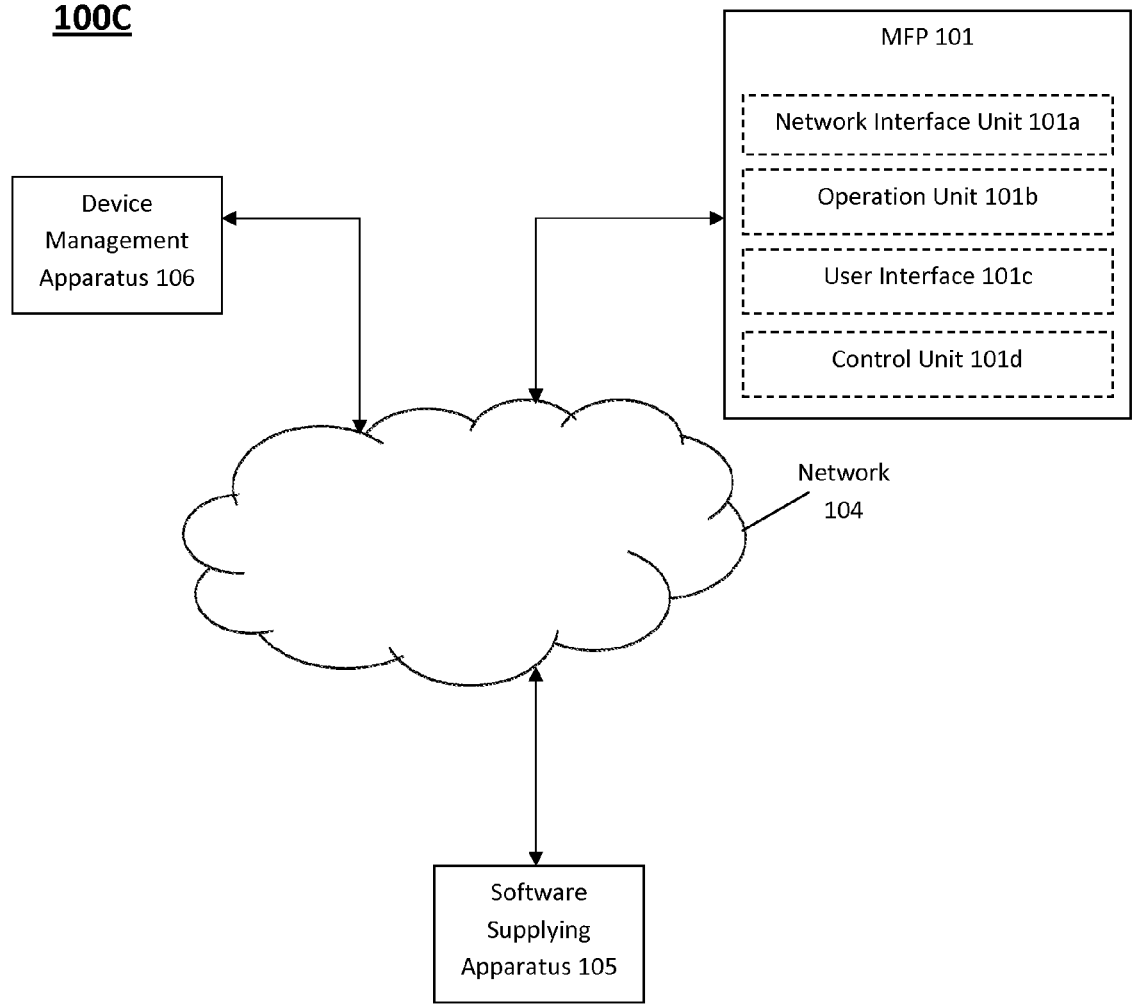
FIG. 1C shows a block diagram of a system for authorizing and activating functions in a multi-functional apparatus, according to another exemplary embodiment.

FIG. 1C shows schematically a system 100C, according to another exemplary embodiment. The system 100C is similar to the system 100B of FIG. 1B except that the system additionally includes a device management apparatus 106.

The device management apparatus 106 manages and collects data from a plurality of devices throughout the network 104. For example, the device management apparatus 106 may store information on the MFP 101. This information may include a name/identifier, functions (black & white, duplex, fax, scanning, N-up, etc.), physical location, network address (IP address, MAC address, etc.), output technology (laser, inkjet solid ink, thermal, other technology, etc.) supply level (consumable types such as paper and toner>empty/low/ok, etc.), pages per job (e.g., 1, 2, 6-10, etc.), color technology (professional color, convenience color, etc), properties (manufacturer, model, serial number, etc), etc. In addition the device management apparatus 106 may also store user information. The user information may include name of users, username, password, devices that the user has access to, functions that the user has access to, user role, etc. In addition, the device management unit 106 may send this information to the software supplying apparatus when requested.

The software supplying apparatus 106 communicates with the device management apparatus 106 in order to obtain the benefit of the user data maintained by the device management apparatus 106. For example, when the software supplying apparatus 106 receives a request from the MFP 101 for software corresponding to a function (copying, printing, scanning, faxing, etc.), the software supplying apparatus submits a request accompanied by the user credentials to the device management apparatus 106. The device management apparatus 106 determines, based on the user credentials, the functions and their corresponding configurations the user is permitted to use and communicates this information to the software supplying apparatus 105.

Otherwise, operations of the elements of the system 100C are similar to those discussed in connection with the corresponding elements of the system 100B of FIG. 1B.

Figure 2:
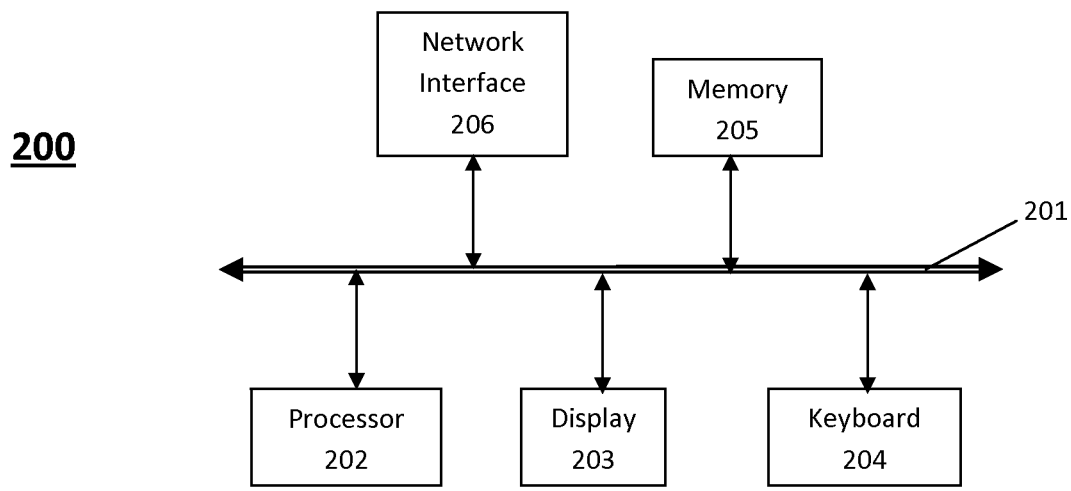
FIG. 2 shows a block diagram of an exemplary configuration of a computing device.

FIG. 2 shows an exemplary constitution of a computer 200 that can be configured (for example, through software) to operate (at least in part) as the software authorization apparatus 102 of FIG. 1A, or the software supplying apparatus 105 of FIG. 1B. As shown in FIG. 2, the management unit 600 includes a controller (or central processing unit) 202 that communicates with a number of other components, including display 203, keyboard 204, memory or storage part 205 and network interface 206, by way of a system bus 201. The computing device 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 200 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 3:
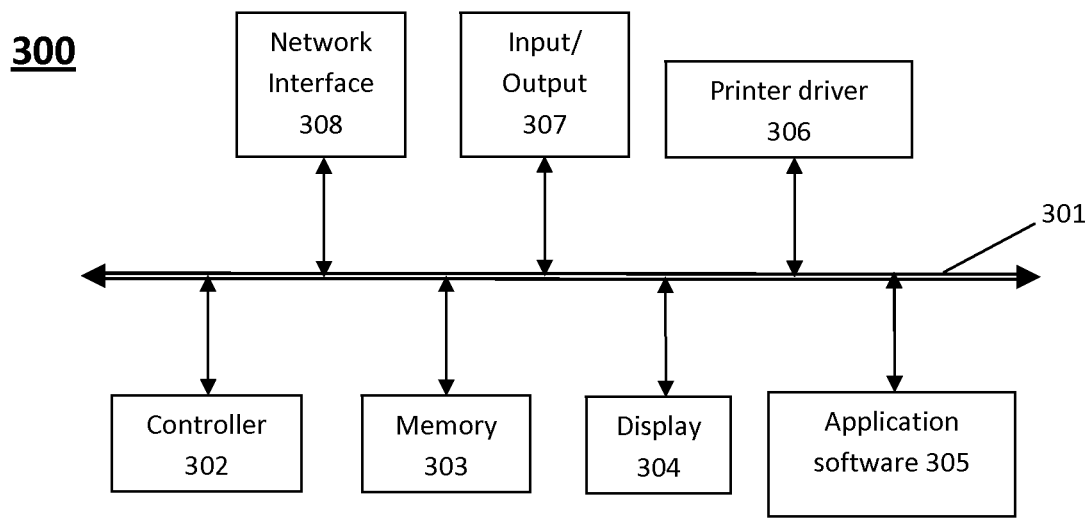
FIG. 3 shows a block diagram of an exemplary configuration of a terminal.

FIG. 3 shows an exemplary constitution of the terminal 103 of FIG. 1A (for example, as a computer). In FIG. 3, a computer 300 includes a controller (or central processing unit) 302 that communicates with a number of other components, including memory 303, display 304, application software 305, print driver 306, input/output (such as mouse, keyboard, touchpad, stylus, microphone and/or speaker with voice/ speech interface and/or recognition software, etc.) 307 and network interface 308, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 308 provides a connection (for example, by way of an Ethernet connection or other network connection which supports any desired network protocol such as, but not limited to TCP/IP, IPX, IPX/SPX, or NetBEUI) to the network to which the computer 300 is connected (e.g. network 104 of FIG. 1A).

The application software 305 and the print driver 306 are shown as components connected to the internal bus 301, but in practice are typically stored in storage media such as a hard disk or portable media, and/or received through the network, and loaded into memory 303 as the need arises.

Depending on the type of the particular terminal device, one or more of the components shown in FIG. 3 may be missing. For example, a particular mobile phone may be missing the print driver 306.

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 4 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 400 shown in FIG. 4 includes a controller 402, and various elements connected to the controller 402 by an internal bus 401. The controller 402 controls and monitors operations of the MFP 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a user management table 406, a converter 407, a network interface (I/F) 408 and a user interface 409.

Storage 403 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the MFP 400, to enable the MFP 400 to interact with a terminal, as well as perhaps other external devices, through the network interface 408, and interactions with users through the user interface 409.

The network interface 408 is utilized by the MFP 400 to communicate with other network-connected devices such as a terminal, a software authorization apparatus (e.g. the software authorization apparatus 102 of FIG. 1A) or a software supplying apparatus (e.g. the software supplying apparatus of FIG. 1B) and receive data requests, print jobs, user interfaces, and etc.

The user interface 409 includes one or more electronic visual displays that display, under control of controller 402, information allowing the user of the MFP 400 to interact with the MFP 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 400, so as to allow the operator to interact conveniently with services provided on the MFP 400, or with the MFP 400 serving as terminal for accessing electronic data or other content through the network. User interfaces or other contents received through the network via the network interface 408 can be displayed on the display screen.

The display screen does not need to be integral with, or embedded in, a housing of the MFD 400, but may simply be coupled to the MFD 400 by either a wire or a wireless connection. The user I/O 409 may include keys and/or buttons (such as graphical keys or buttons, or other graphical elements, of a GUI on a touchscreen display) for inputting information or requesting various operations. Alternatively, the user I/O 409 and the display screen may be operated by a keyboard, a mouse, a remote control, voice recognition (e.g., through a speaker/microphone 609a), or eye-movement tracking, or a combination thereof.

Since the MFD 400 is typically shared by a number of users, and is typically stationed in a common area, the MFD 400 preferably prompts the user to supply login credentials or authentication information, such as user name (or other user or group information), password, access code, etc. The user credentials can be compared to data stored in the user management table 406 to confirm that the user is authorized to use the MFD 400. The user credentials may also be stored for the session and automatically supplied if access to other devices through the network requires it. On the other hand, such other devices may prompt the user to supply other user credentials through the user interface.

Other methods of authentication may also be used. For example, the MFD 400 may be equipped with a card reader or one or more biometrics means (such as comparing fingerprints, palm prints, voice or speech, retinas or irises, facial expressions or features, signature, etc.).

The MFD 400 may communicate the user credentials, provided in the manners discussed above, to other devices or applications connected to the MFD 400 via a network (e.g., the network 104 of FIG. 1A) for determining authorization for performing jobs.

Scanning 404, printing 405, and network interface 408 are otherwise conventional, and therefore, a detailed description of such conventional aspects is omitted in the interest of clarity and brevity.

The MFP 400 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

FIG. 5A shows a table indicating the cost for each mode corresponding to a configuration of a copy and print functions. As shown in FIG. 5A, there are four configurations which include speed, color, paper size and paper output. Each of the configurations also has one or more corresponding modes. However, these configurations and modes are merely exemplary and are not limited to what is shown in FIG. 5A. Additional configurations and modes may be included as well.

The speed configuration determines the rate at which the MFP 101 will output the paper and comprises four modes of configuration which, ranked from fastest rate to the lowest rate, are super H, high, medium and standard. For example, the super H configuration may allow the MFP 101 to output paper at a rate of 100 sheets per minute, while the standard configuration may only allow the MFP 101 to output paper a rate of 10 sheets per minute. As shown the cost for each configuration is fixed and increases as the paper output rate increases.

The color configuration determines the color that the copied document will be outputted in and comprises three modes of configuration which are color, gray scale and black & white. As shown, each of the configurations contains a configuration cost which is fixed and a per page cost which depends on the number of pages that the user has copied. Due to the expensive cost of the color ink, users are charged more for using the color configuration than for the gray scale and black & white configuration.

The paper size configuration determines the paper type that the copied document will be outputted in and comprises four modes of configuration which are A3, B2, A4 and 8.5×11. As shown, similar to the color setting, each of the configurations contains a configuration cost which is fixed and a per page cost which depends on the number of pages that the user has copied. In addition, it should be noted in this example, that cost is not dependent on the paper size. Since 8.5×11 and A4 are commonly used paper sizes, they cost less than the A3 and B2 which are paper sizes not commonly used.

The paper output configuration determines the layout the copied document will be outputted in and comprises three modes of configuration which are 1 sided, 2 sided and duplex. As shown, similar to the color and paper size setting, each of the configurations contains a configuration cost which is fixed and a per page cost which depends on the number of pages that the user has copied.

FIG. 5B shows a table indicating the cost for each configuration corresponding to a setting for the faxing function. As shown in FIG. 5B, there are three modes of configuration which include line, service and destination. Each of the configurations also has one or more corresponding modes. However, these configurations and modes are merely exemplary and are not limited to what is shown in FIG. 5B. Additional configurations and modes may be included as well.

The line configuration determines if the fax will be sent domestically or internationally. Since faxing is traditionally performed by using the phone lines, costs may increase for faxes being sent to countries other than the one where the faxing is being performed.

The service mode determines how the fax will be sent. For example, the user may want to send the fax through a traditional phone line. On the other hand, the user may also have the option of sending the fax through the internet.

The destination configuration determines where the fax is sent to. Users have the option of selecting a fax number or an e-mail address. If the user selects the e-mail address, the document being faxed is converted to a PDF document and sent through the internet, whereas if the destination is a fax number, the document is sent through the phone line instead.

FIG. 5C shows a table indicating the cost for each configuration corresponding to a setting for the scanning function. As shown in FIG. 5C, there are four modes of configuration which include color, PPI (pixels per inch) or DPI (dots per inch), destination and output file format. Each of the configurations also has one or more corresponding modes. However, these configurations and modes are merely exemplary and are not limited to what is shown in FIG. 5C. Additional configurations and modes may be included as well.

The color configuration determines the color that the scanned document is outputted in and comprises three modes of configuration which are color, gray scale and black & white. As shown, each of the configurations contains a configuration cost which is fixed and a per page cost which depends on the number of pages that the user has scanned.

The pixels per inch (PPI; or DPI) mode determines the resolution that the document is scanned in and comprises four modes of configuration which are 600, 300, 150 and 70. As shown, each of the configurations contains a configuration cost which is fixed and a per page cost which depends on the number of pages that the user has scanned.

The destination configuration determines where the scanned document is sent and comprises four modes of configuration which are E-mail, network drive, external storage and PC. As shown, each of the configurations contains a configuration cost which is fixed and a per 100 kilobyte cost which depends on the number of kilobytes the document scanned is made up of.

The output file format configuration determines the format the user wants the scanned document to be outputted in and comprises four modes of configuration which are PDF, JPEG, GIF and PNG. As shown, each of the configurations contains a configuration cost which is fixed and a per page cost which depends on the number of pages that the user has scanned.

FIGS. 6A-6C shows a table indicating for each user, the role of the user and functions to which the user has access. For example, a user with the role as an administrator has the highest privilege and thus has access to all the functions (copying, printing, scanning, faxing, etc.) and their corresponding configurations. On the other hand, a user who is a guest has limited access to the functions and configurations.

Figure 7A:
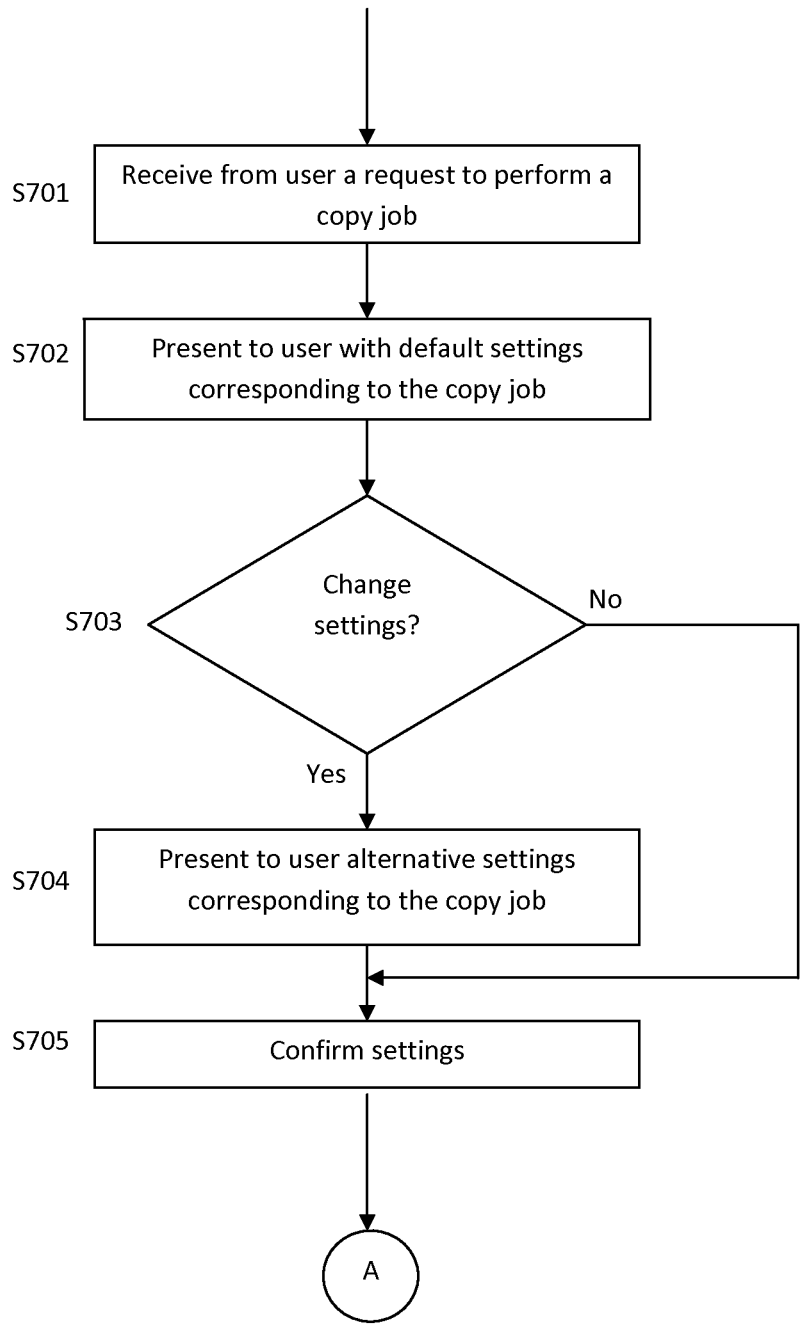
FIGS. 7A-7B show a flow chart of a method performed by an MFP, such as MFP 101 shown in any of FIGS. 1A-1C.
Figure 7B:
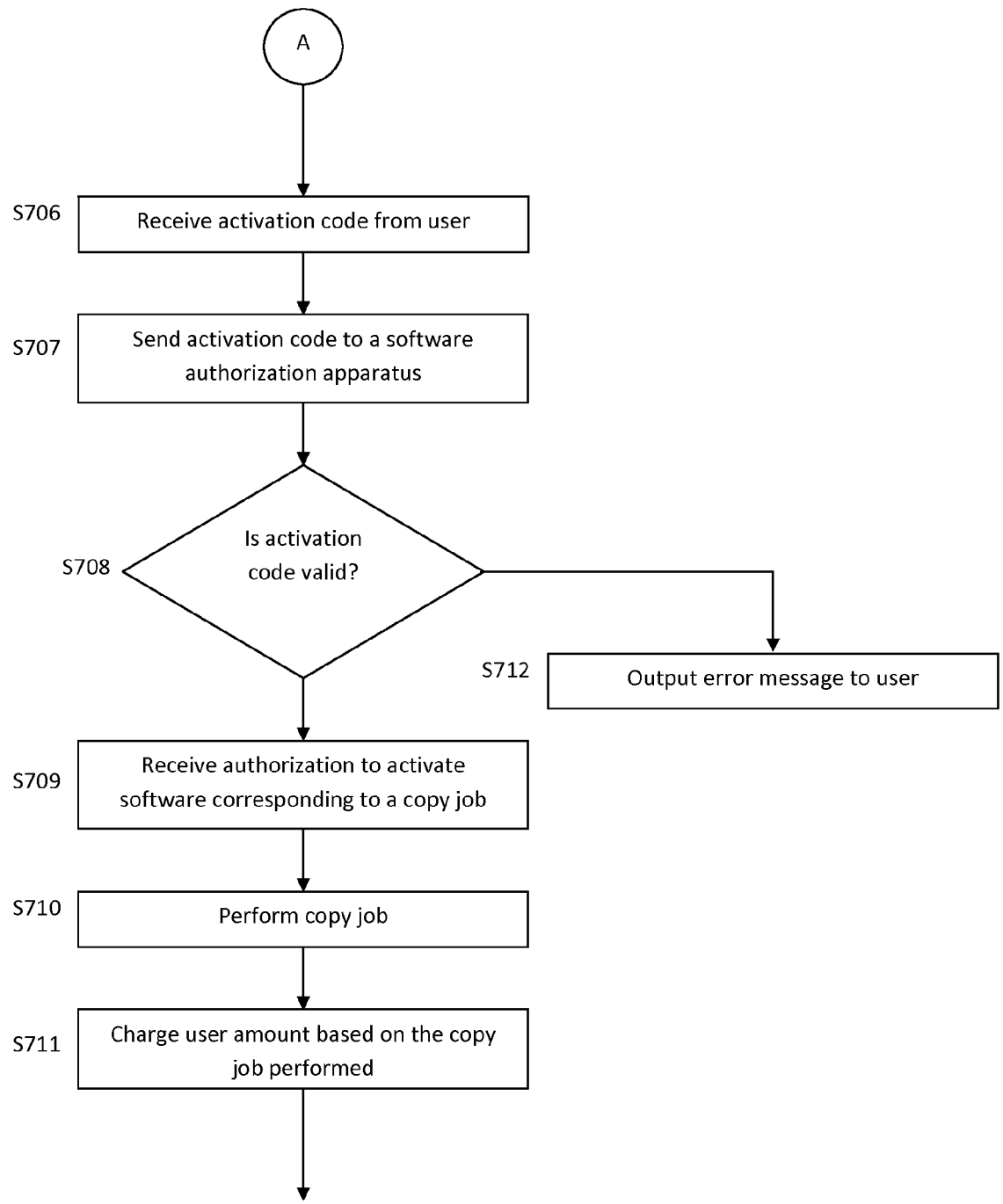

FIGS. 7A and 7B show a process performed by an MFP (e.g., 101), for performing a copy job, according to an exemplary embodiment.

When a user wants to copy a document by using the MFP 101, the user first inputs user credentials to access the MFP 101, such as via a user interface screen, shown by way of example in FIG. 8A. Then the MFP 101 presents to the user, information on the amount of money remaining in the account of the user and the list of functions that the MFP can perform. For example, as illustrated in FIG. 8B, the functions may typically be copying, printing, scanning, faxing. However, non-paper related processing jobs such as viewing the job history or performing administrative tasks may also be included as well.

In this case, the user requests the MFP 101 to perform a copy job (step S701). Next, the MFP 101 presents the user with a list of default settings for the copy job (step S702). For example, as shown in FIG. 8C, the default settings are currently "Standard" for speed, "Black & White" for color, "8.5× 11" per paper size and "duplex" for paper output. The user can select whether or not to change the default settings. In a case in which the user wants to change the default settings, the MFP 101 presents the user with a list of alternative settings (step S703, Yes). Otherwise, the user is prompted by the MFP 101 to confirm the default settings. For example, as shown in FIG. 8D, the user is presented with four configurations which are speed, color, paper size, and paper output. In addition, the cost per page of each configuration is also presented to the user. The user may select a mode for each configuration. The user "Shark" has selected "Super H" for speed, "Black & White" for color, "A4" for paper size and "2 sided" for paper output. After pressing the "confirm" button or the user has decided not to change the default settings presented previously, the MFP 101 presents the user with a list of the selections made, the fixed cost of each selection and the per page cost for each selection (if applicable) as shown in FIG. 8E.

Figure 8G:
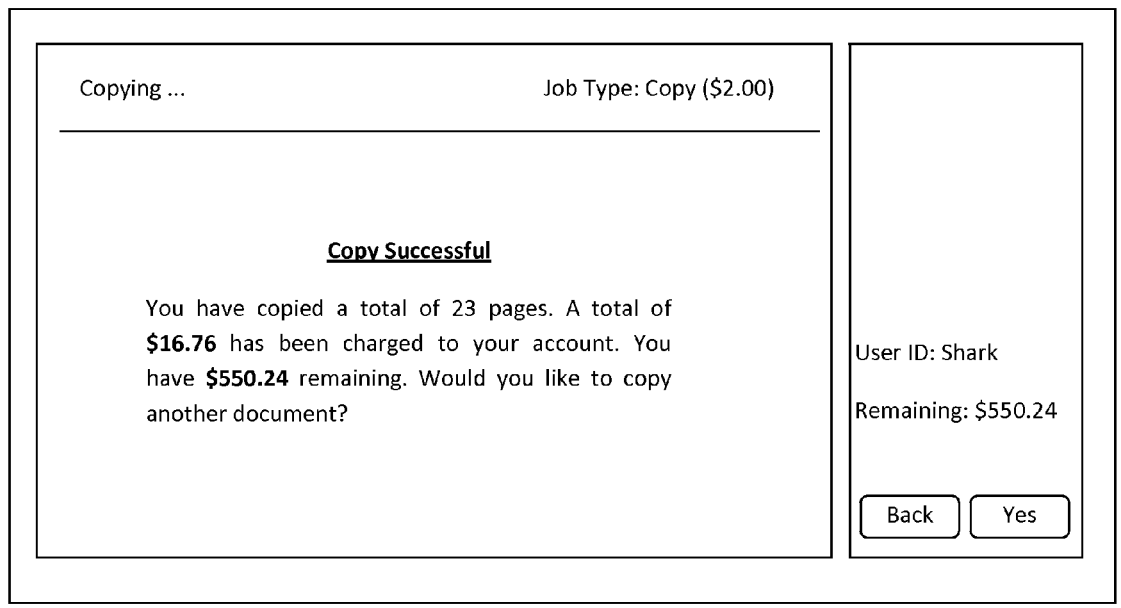

Once the user has confirmed the selections (step S705), the MFP 101 prompts the user to input an activation code as shown in FIG. 8F (step S706). The activation code is than sent by the MFP 101 to the software authorization apparatus to be validated (step S707). In a case in which the activation code is valid (step S708, Yes), the software authorization apparatus allows the software corresponding to the copy job to be activated (step S709) and the MFP 101 performs the copying process (step S710). Otherwise an error message is outputted by the MFP 101 to the user (step S712). Once the copying has finished, the user is presented with a message informing the user the total number of pages copied, the amount that was charged to the account of the user and the amount remaining in the account as shown in FIG. 8G (step S711).

Figure 9:
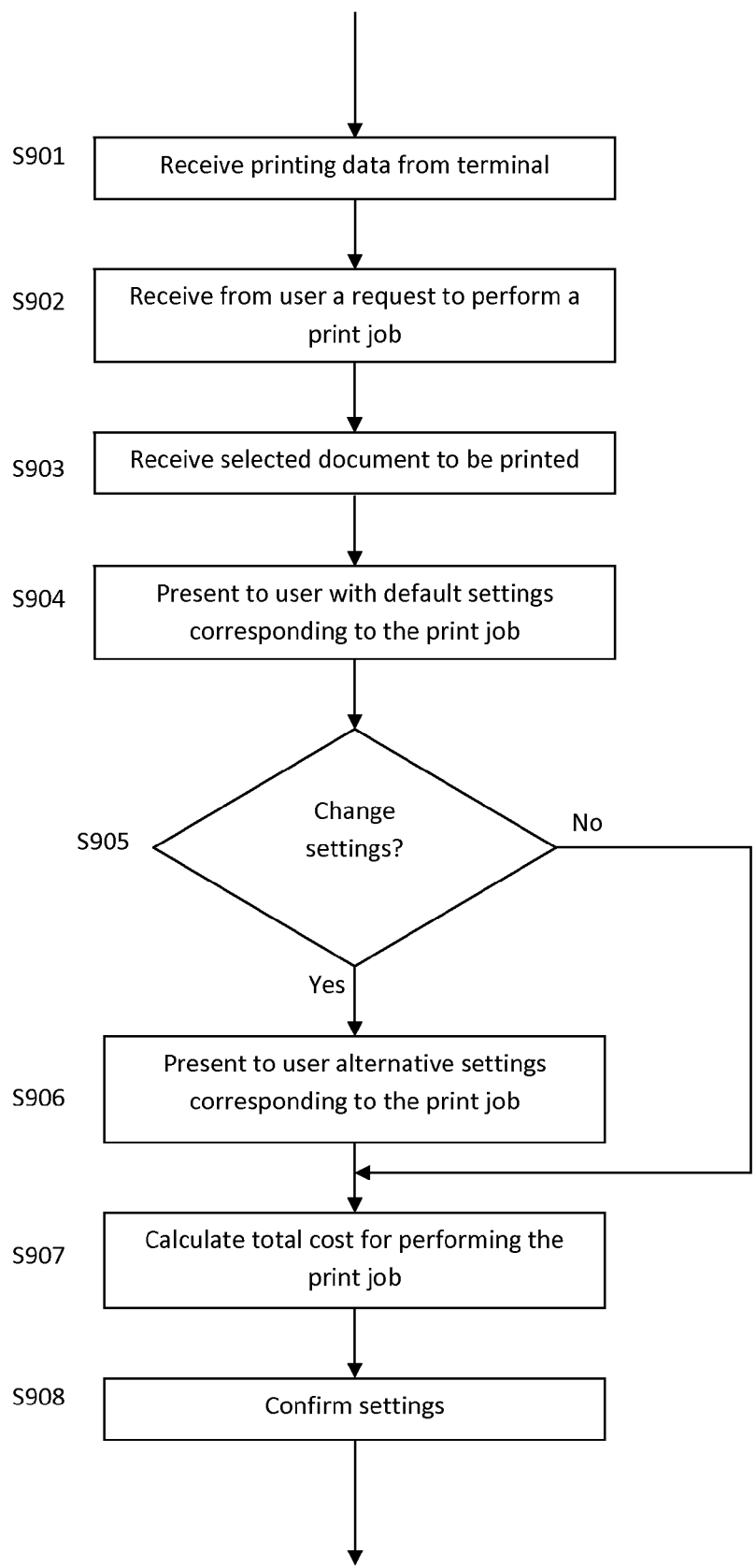
FIG. 9 shows a flow chart of a method performed by an MFP, such as MFP 101 shown in any of FIGS. 1A-1C.

FIG. 9 shows a process performed by an MFP (e.g., 101), for performing a print job, according to another exemplary embodiment.

When the user wants to perform a print job, the user may send multiple documents or files from the terminal 103 in the form of print data to the MFP 101 (step S901). The MFP 101 stores the print data until the user selects one of the documents to print. The user then inputs user credentials in order to access the MFP 101 and is presented with the option for performing a print job as shown previously in FIGS. 8A and 8B. The user then requests the MFP 101 to perform a print job (step S902). Next, the user is presented with a list of documents to be printed along with their respective number of pages as illustrated in FIG. 10A. In this case, the user "John" has selected the document "Marketing.pdf" which has a total of 20 pages (step S903). Next, the MFP 101 presents the user with a list of default settings for the copy job (step S904). The user can select whether or not to change the default settings. In a case in which the user wants to change the default settings (step S905, Yes), the MFP 101 presents the user with a list of alternative settings (step S906). Otherwise, the user is prompted by the MFP 101 to confirm the default settings (step S905, No).

However, when the user is reviewing the selections made as shown in FIG. 10B, the user is presented with more information than when the user is performing a copy job. For example, the user is presented with the number of color pages and the number of black & white pages within "Marketing.pdf", the information of which is obtained from the print data. In addition, since the number of pages is known, the MFP 101 can calculate the total amount that is charged for performing the print job (step S907). Further, the cost for performing the print job may not be the same as the cost for performing the copy job despite each job having the same settings. For example, the user "John" has selected "color" for the color setting. Since the document "Marketing.pdf" contains 10 pages in color and 10 pages in black and white, "John" is charged $10.00 for the pages in color since the cost for printing in "color" is $1.00/page and $2.50 for the pages in black and white since the cost for printing in "black & white" is $0.25/page. However, since "John" printed in color, the cost for that configuration remains $0.07. As a result the subtotal for printing in "color" is $12.57. As seen, this is different from the copy job wherein the user is charged the same amount regardless of the pages being in color or black and white. In a case "John" had performed a copy job the subtotal for printing in "color" would have been $20.00.

After the user has confirmed the settings (step S908), the process for printing out the document is similar to the process shown in FIG. 7B for a copy job. The user inputs the activation code which is sent to the software authorization apparatus in order for the MFP 101 to be allowed to perform the print job. After the print job is performed, the user is presented with information on the amount charged to the user and the amount remaining in the account of the user, similar to the information shown in FIG. 8G.

Figure 11:
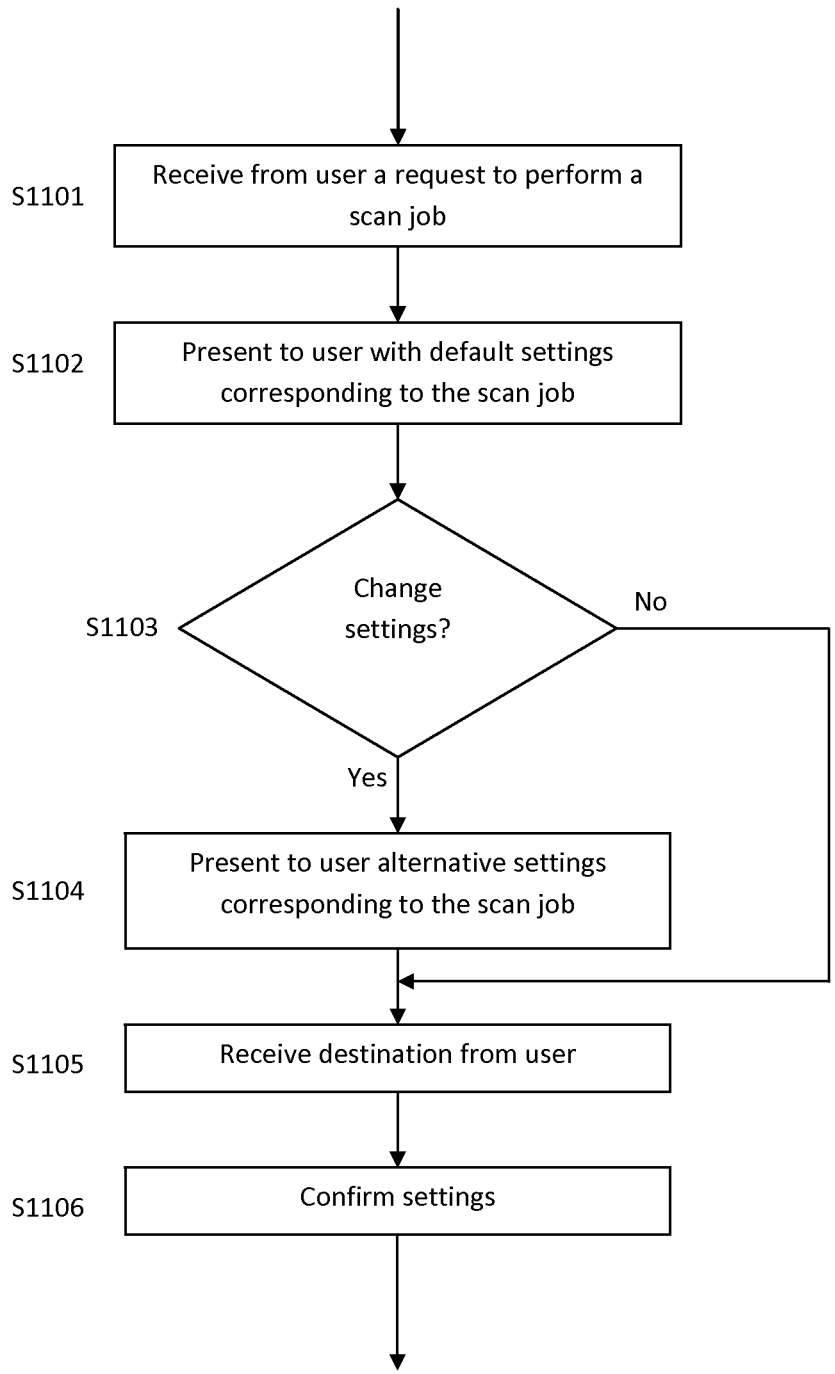
FIG. 11 shows a flow chart of a method performed by an MFP, such as MFP 101 shown in any of FIGS. 1A-1C.

FIG. 11 shows a process performed by an MFP (e.g., 101), for performing a scan job, according to another exemplary embodiment.

When the user wants to perform a scan job, the user inputs user credentials in order to access the MFP 101 and is presented with user interface screens, such as discussed previously with reference to the examples shown in FIGS. 8A and 8B, to allow the user to pursue the option of performing a scan job. The user can then request the MFP 101 to perform a scan job (step S1101). Next, the MFP 101 presents the user with a list of default settings for the scan job (step S1102). The user can select whether or not to change the default settings. In a case in which the user wants to change the default settings (step S1103, Yes), the MFP 101 presents the user with a list of alternative settings (step S1104). Otherwise, the user is prompted by the MFP 101 to input the destination (step S1103, No).

However, since the MFP 101 is converting the contents of the document into a digital file, the configurations for the scan job are different from the ones in the print and copy job. For example, as shown in FIG. 12A, the user is presented with configurations such as "PPI" (or DPI), "Destination" and "Output Data Format". Further, because the contents of the document to be scanned are converted into a digital file, the user may be charged not just for the pages scanned but also for the number of bytes that the digital file now contains as well.

Next, the user inputs a destination for the scanned document (step S1105). For example, as shown in FIG. 12B, the user has selected the scanned document to be sent to an e-mail address.

Figure 12C:
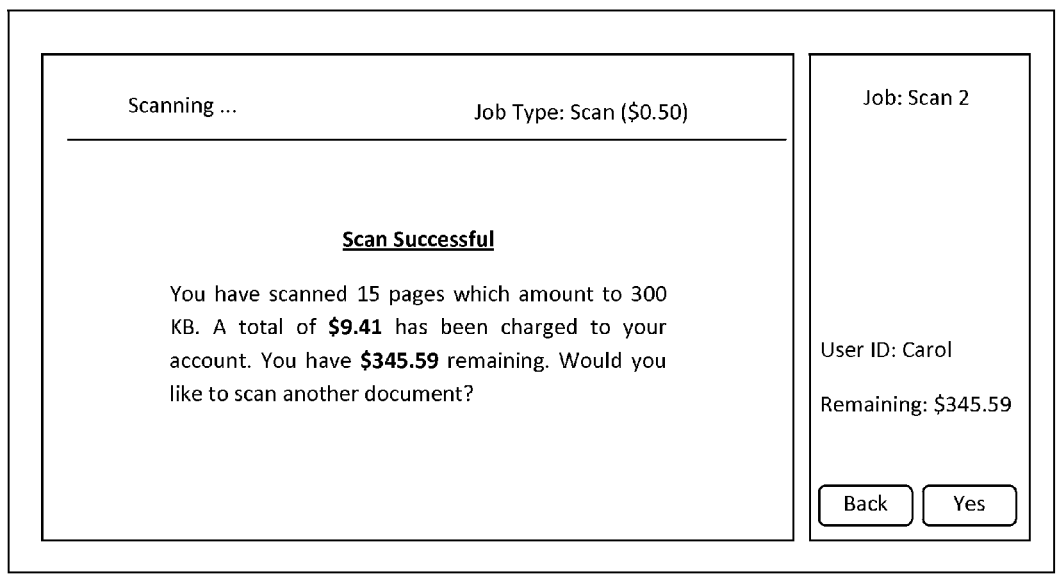

After the user has confirmed the settings (step S1107), the process for scanning the document is similar to the process shown in FIG. 7B for performing a copy job. The user inputs the activation code which is sent to the software authorization apparatus in order for the MFP 101 to be allowed to perform the scan job. After the scan job is performed, the user is presented with information on the amount charged to the user, the total bytes that make up the scanned document, and the amount remaining in the account of the user as shown in FIG. 12C.

Figure 13:
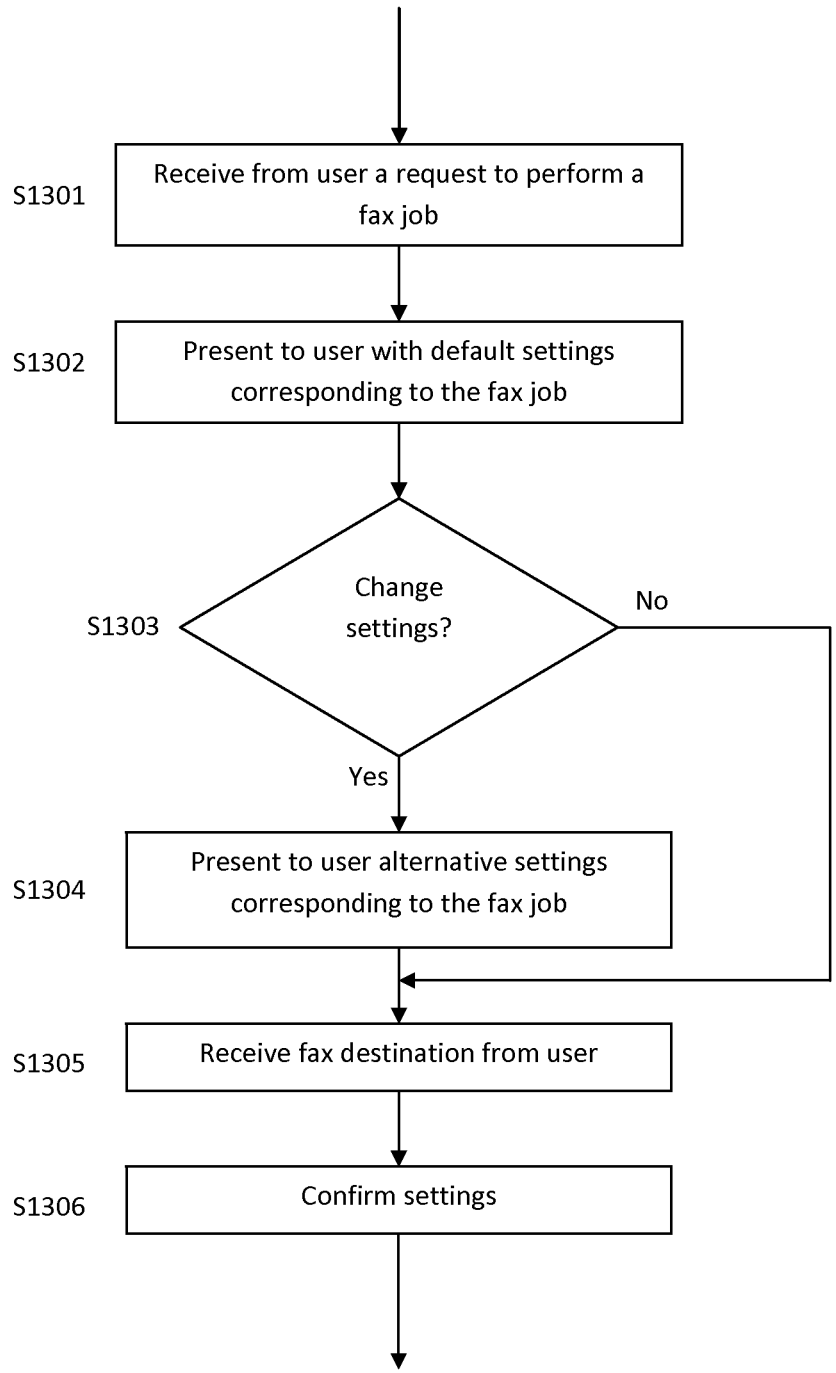
FIG. 13 shows a flow chart of a method performed by an MFP, such as MFP 101 shown in any of FIGS. 1A-1C.

FIG. 13 shows a process performed by an MFP (e.g., 101), for performing a fax job, according to another exemplary embodiment.

When the user wants to perform a fax job, the user inputs user credentials in order to access the MFP 101 and is presented with user interface screens, such as discussed previously with reference to the examples shown in FIGS. 8A and 8B, to allow the user to select the option of performing a scan job. The user then requests the MFP 101 to perform a fax job (step S1301). Next, the MFP 101 presents the user with a list of default settings for the fax job (step S1302). The user can select whether or not to change the default settings. In a case in which the user wants to change the default settings (step S1303, Yes), the MFP 101 presents the user with a list of alternative settings (step S1304). Otherwise, the user is prompted by the MFP 101 to input the destination (step S1303, No).

However, since the MFP 101 is sending the contents of the documents to an e-mail address or a fax number, the settings and configurations for the fax job are different from the ones in the copy, print and scan jobs. For example, as shown in FIG. 14A, the user is presented with settings such as "Line", "Destination" and "Service".

Next, the user inputs a destination for the faxed document (step S1305). For example, as shown in FIG. 14B, the user has selected the faxed document to be sent to a fax number corresponding to a destination in Tokyo, Japan.

Figure 14E:
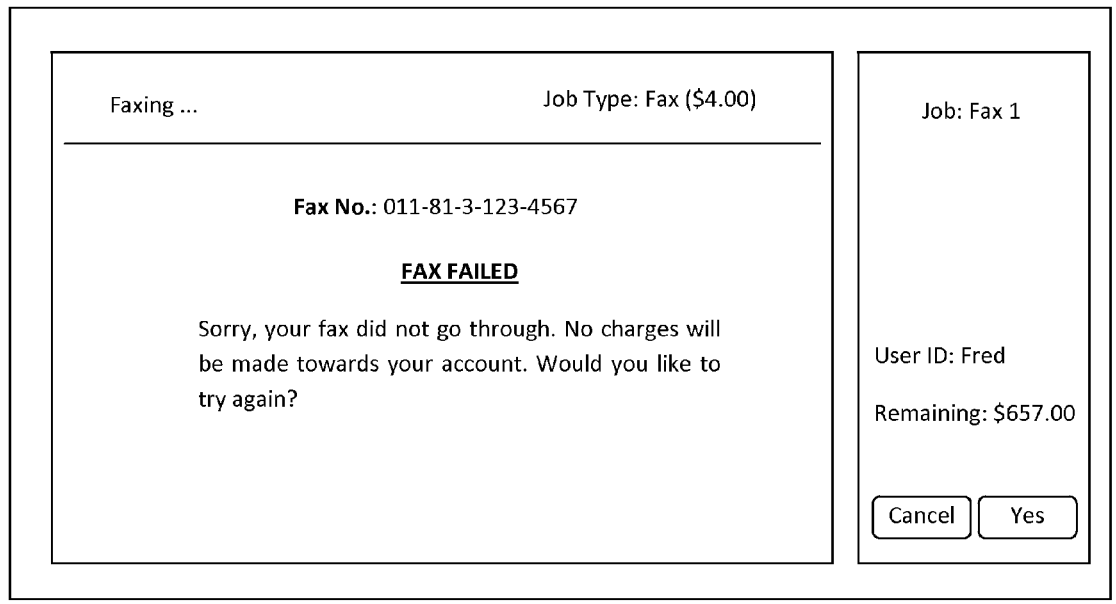

After the user has confirmed the settings (step S1306) via the user interface screen shown in FIG. 14C, the process for scanning the document is similar to the process shown in FIG. 7B for a copy job. The user inputs the activation code which is sent to the software authorization apparatus in order for the MFP 101 to be allowed to perform the fax job. After the fax job is performed, the user is presented with information on the number of pages faxed, the fax no. (or email-address), the amount charged to the user and the amount remaining in the account of the user as shown in FIG. 14D. However, the fax may be unsuccessfully due to inputting the wrong number, busy lines, bad connection, etc. as shown in FIG. 14E. In this case, since the fax was not sent, the user is not charged any amount.

In previous embodiments, the software for activating the operating unit of the MFP 101 allowing the MFP 101 to perform specific jobs was pre-installed. However, this poses a security risk as there are many ways of accessing the functions of the MFP 101 without obtaining an activation code. For example, malicious users may exploit a bug or a design flaw within the MFP 101 to gain unauthorized access. To solve this issue, software may be stored in an external device such as a software supplying apparatus. When the MFP 101 needs to perform the function requested by the user, the MFP 101 may download the required software from an external device.

Figure 15:
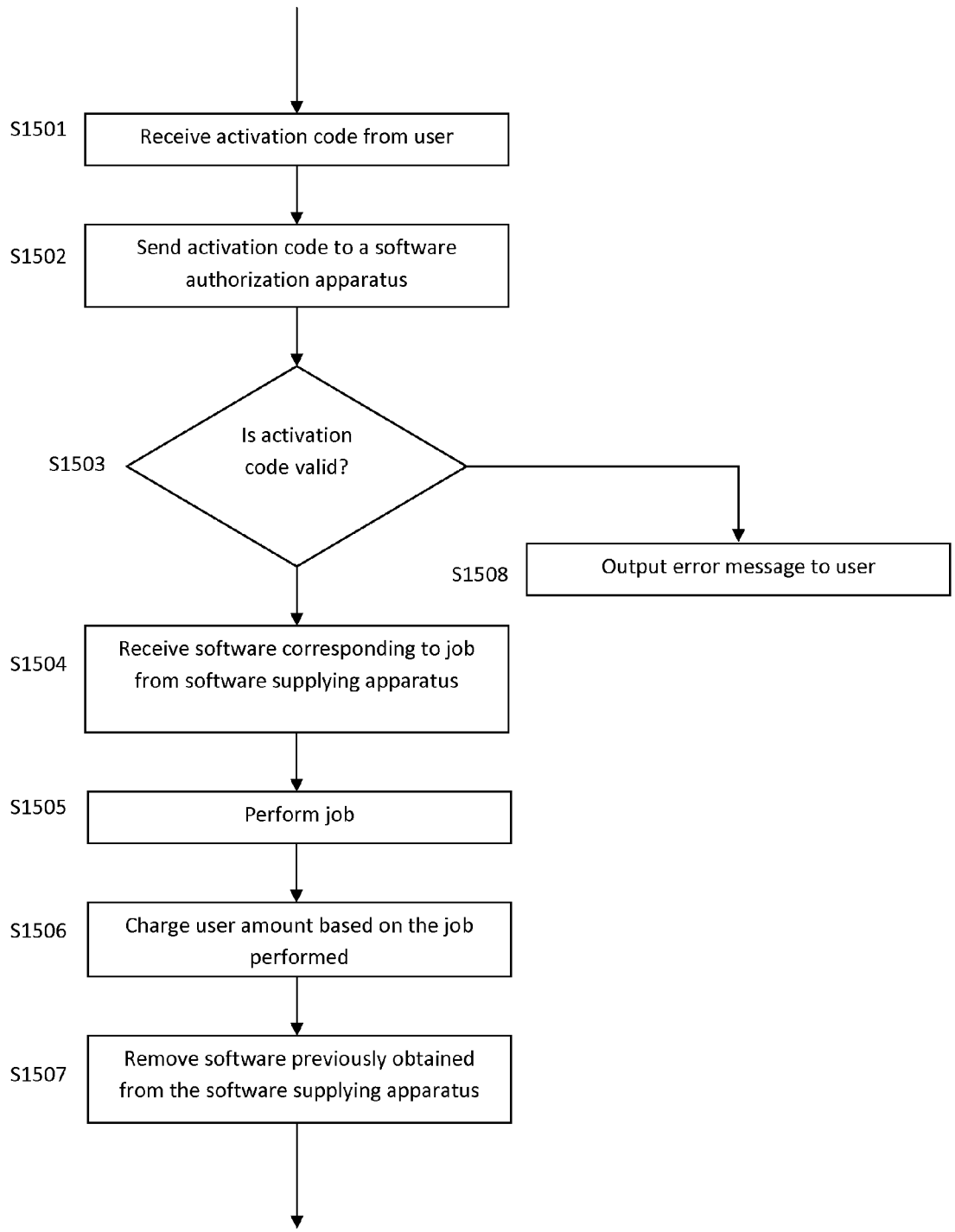
FIG. 15 shows a flow chart of a method performed by an MFP, such as MFP 101 shown in any of FIGS. 1A-1C.

FIG. 15 shows a process performed by an MFP (e.g., 101), for performing a specific job when software for causing the operating unit to perform that specific job is not pre-installed, according to another exemplary embodiment.

Similar to the previous embodiments, when a user wants to have the MFP 101 perform a job, the user selects the settings and configurations, and inputs an activation code into the MFP 101 (step S1501). The MFP then sends activation code to a software supplying apparatus to be validated (step S1502). In a case in which the activation code is valid (step S1503, Yes), the software supplying apparatus sends the software corresponding to the job to be performed to the MFP 101 (step S1504). Otherwise (step S1503, No) an error message is outputted to the user (step 1508). After receiving the software, the MFP 101 installs the software and performs the request job. After performing the job, the MFP 101 charges the user with the amount corresponding to the job (step S1506). Then the MFP 101 removes the software (S1507).

However, it should be noted that there are disadvantages to storing software in an external device as well. When downloading the software, the user may not only have to wait an amount of time before it is complete but also wait an addition amount of time for the downloaded software to be installed. Further, the process of downloading the software may also use up bandwidth.

Figure 16:
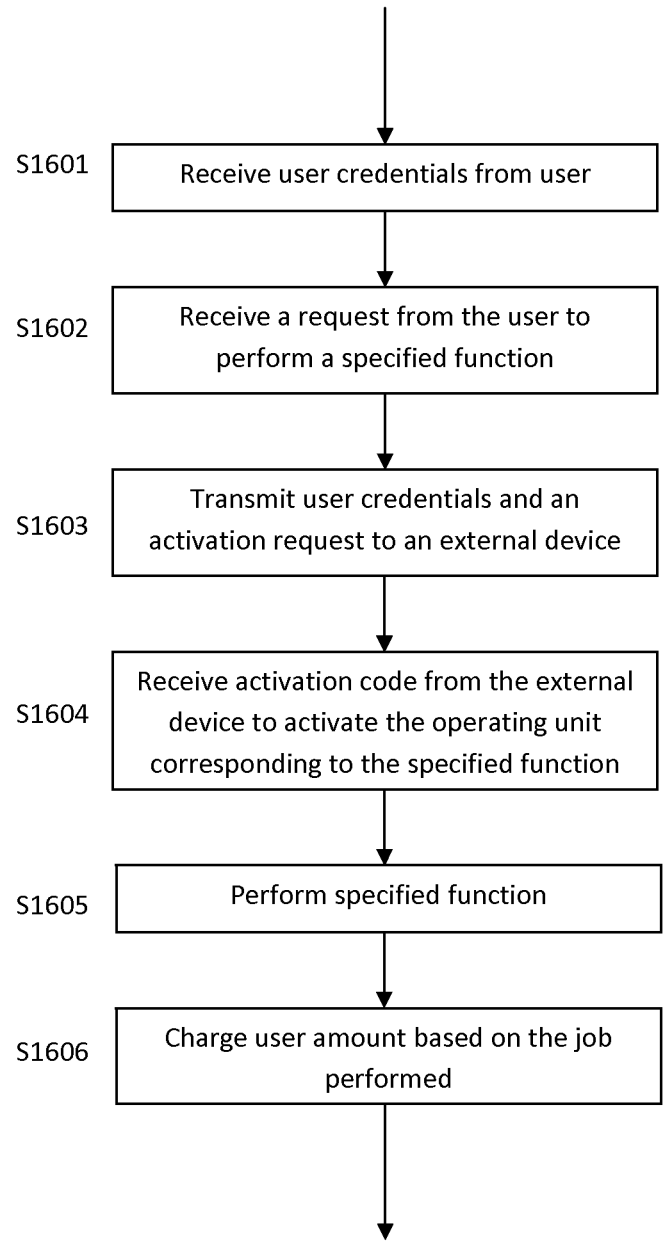
FIG. 16 shows a flow chart of a method for authorizing and activating functions in a multi-functional apparatus, according to an exemplary embodiment.

Turning now to FIG. 16, there is shown a flowchart of a method performed by an access control application, such as illustrated in FIG. 1A, according to an exemplary embodiment.

When a user accesses a multi-functional printer (MFP), (copying, printing, scanning, faxing, etc.), the MFP receives user credentials from the user (step S1601). After validating the user credentials, the MFP receives a request from the user to perform a specified function (step S1602). The MFP then sends the user credentials and an activation request to a software authorization apparatus in order to be authorized to perform the specified function (step S1603). In a case in which the user permitted to use the specified function that was requested, the software authorization apparatus sends an activation code to the MFP in order activate the software of the one or more operation units corresponding to the specified function (step S1604). Once the software is activated, the MFP performs the specified function which was previously requested by the user (step S1605). After the MFP has finished performing the specified function, an amount corresponding to the specified function is charged to the user (step S1606).

The orders in which the steps are performed in the aforementioned methods are not limited to those shown in the examples of FIGS. 7A-7B, 9, 11, 13, 15 and 16, and may be switched as long as similar results are achieved. Also, it should be noted that the methods illustrated in the examples of FIGS. 7A-7B, 9, 11, 13, 15 and 16 may be implemented using any of the systems described in connection with FIGS. 1A-1C.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A multi-function apparatus including a processor and a non-transitory computer-readable medium embodying one or more programs of instructions executable by the processor to configure the multi-function apparatus to receive authorization through a network to activate, upon demand, software corresponding to one or more functions in the multi-function apparatus and to comprise:

a network interface unit configured for the multi-function apparatus to communicate with an external device through the network, said device being external to the multi-function apparatus;

a plurality of operation units configurable by software to provide specific functions, when the software is activated;

a user interface unit that provides a user a choice of functions to activate and configure by the software, wherein the software is inactive by default, and the user interface unit includes an activation part for entry by the user of an activation code to activate required software for a selected function; and a control unit that, upon user selection of the function and entry of the activation code, communicates through the network interface unit with an external device to request authorization for activating the required software for the selected function for use by the user, and in response to said authorization from the external device, causes the required software for the selected function to be activated to configure corresponding operation units,
wherein when one or more of the operation units provide the selected function, the control unit updates an accounting of charges to the user to include a charge for performing the selected function.

2. The multi-function apparatus of claim 1, wherein the user interface unit permits the user to specify device settings different than default settings, and upon activation and the selected function having been performed in response to command of the user, the control unit updates the accounting of charges to the user to include an additional charge for applying the specified device settings, in addition to the charge for performing the selected function.

3. The multi-function apparatus of claim 1, wherein the plurality of operation units include specific operation units to be activated for performing one or more scan functions, and when the user selects a specified scan function through the user interface unit, the control unit communicates through the network interface unit with the external device to request authorization for activating the required software for the specified scan function, and in response to said authorization from the external device, the control unit activates corresponding software to configure the specific operation units to perform the specified scan function, and the control unit updates the accounting of charges to the external device to include a charge for performing the specified scan function.

4. The multi-function apparatus of claim 1, wherein the plurality of operation units include specific operation units to be activated for performing one or more print functions, and when the user, through the user interface unit, selects a specified print function and specifies configuration settings different than default settings, the control unit communicates through the network interface unit with the external device to request authorization for activating the required software for the specified print function with the specified configuration settings, the control unit activates corresponding software to configure the specific operation units based on the specified configuration settings to perform the specified print function, and the control unit updates the accounting of charges to the user to include a charge for performing the specified print function and an additional charge for applying the specified configuration settings.

5. The multi-function apparatus of claim 1, wherein the plurality of operation units include specific operation units to be activated for performing one or more digital copy functions, and when the user, through the user interface unit, selects a specified digital copy function and specifies configuration settings different than default settings, the control unit communicates through the network interface unit with the external device to request authorization for activating the required software for the specified digital copy function with the specified configuration settings, the control unit activates corresponding software to configure the specific operation units based on the specified configuration settings to perform the specified digital copy function, and the control unit updates the accounting of charges to the user to include a charge for performing the specified digital copy function and an additional charge for applying the specified configuration settings.

6. The multi-function apparatus of claim 1, wherein the user interface unit provides the user with a choice of plural speeds for performing the selected function, and the charge for performing the selected function at a first speed amongst the plural speeds is higher than the charge for performing the selected function at a second speed that is lower than the first speed.

7. The multi-function apparatus of claim 1, wherein the authorization from the external device is determined based on a user role of the requesting user, and authorization provided upon request from a first user of a first user role activates software for a first set of functions and authorization provided upon request from a second user of a second user role activates software for a second set of functions that is not identical to the first set of functions.

8. The multi-function apparatus of claim 1, wherein the required software for the selected function is downloaded through the network upon entry and authentication of the activation code for the selected function.

9. The multi-function apparatus of claim 8, wherein
the authorization from the external device is determined based on a user role of the requesting user, and wherein
the software downloaded through the network upon authentication of the activation code entered by a first user of a first user role activates software is for a first set of functions, and the software downloaded through the network upon authentication of the activation code entered by a second user of a second user role activates software for a second set of functions that is not identical to the first set of functions.

10. A multi-function apparatus including a processor and a non-transitory computer-readable medium embodying one or more programs of instructions executable by the processor to configure the multi-function apparatus to receive commands through a network to activate, upon demand, software corresponding to one or more functionalities in the multi-function apparatus and to comprise:
a network interface unit configured for the multi-function apparatus to communicate with an external device through the network, said device being external to the multi-function apparatus;
a plurality of operation units configurable by software to provide functions, when the software is activated;
a control unit that activates, upon command from the external device, the software to configure one or more specified operation units amongst the plurality of operation units, to perform specified functions, and updates an accounting of charges to the external device to include a charge for providing the specified functions.

11. The multi-function apparatus of claim 10, wherein the command from the external device includes specified device settings different than default settings, and the control unit updates the accounting of charges to the external device to include an additional charge for applying the specified device settings, in addition to the charge for performing the specified functions.

12. The multi-function apparatus of claim 10, wherein the command from the external device includes an activation code for authenticating the command from the external device.

13. The multi-function apparatus of claim 10, wherein the plurality of operation units include specific operation units to be activated for performing one or more scan functions, and when the multi-function apparatus receives a command from the external device to perform a specified scan function, the control unit activates corresponding software to configure the specific operation units to perform the specified scan function, and the control unit updates the accounting of charges to the external device to include a charge for performing the specified scan function.

14. The multi-function apparatus of claim 10, wherein the plurality of operation units include specific operation units to be activated for performing one or more print functions, and when the multi-function apparatus receives a command from the external device to perform a specified print function with specified configuration settings different from default settings, the control unit activates corresponding software to configure the specific operation units based on the specified configuration settings to perform the specified print function, and the control unit updates the accounting of charges to the external device to include a charge for performing the specified print function and an additional charge for applying the specified configuration settings.

15. The multi-function apparatus of claim 10, wherein the plurality of operation units include specific operation units to be activated for performing one or more digital copy functions, and when the multi-function apparatus receives a command from the external device to perform a specified digital copy function with specified configuration settings different from default settings, the control unit activates corresponding software to configure the specific operation units based on the specified configuration settings to perform the specified digital copy function, and the control unit updates the accounting of charges to the external device to include a charge for performing the specified print function and an additional charge for applying the specified configuration settings.

16. A method for providing a full set of features through a multi-function apparatus, authorization being received through a network to activate requested functions upon demand, the method comprising:
(a) receiving user credentials through a user interface of the multi-function apparatus;
(b) receiving through the user interface a request for specified function and transmitting the user credentials along with an activation request for the specified function, from the multi-function apparatus through the network to an external device which is external to the multi-function apparatus;
(c) receiving an activation code from said device through the network, and activating software for one or more operation units of the multi-function apparatus, to configure the one or more operation units to provide the specified function, when the software is activated, wherein the software is inactive by default;
(d) performing the specified function; and
(e) updating an accounting of charges to the user to include a charge for providing the specified function.

17. The method of claim 16, further comprising:
receiving through the user interface device settings different than default settings; and
updating the accounting of charges to the user to include an additional charge for applying the specified device settings, in addition to the charge for performing the specified function.

18. The method of claim 16, further comprising:
providing the user, through the user interface, with a choice of plural speeds for performing the specified function, wherein the charge for performing the specified function at a first speed amongst the plural speeds is higher than the charge for performing the specified function at a second speed that is lower than the first speed.

19. The method of claim 16, further comprising:
receiving a command from a requesting device external to the multi-function apparatus to perform a specified print function with specified configuration settings different from default settings;
activating corresponding software to configure corresponding operation units for the specified print function, based on the specified configuration settings, and performing the specified print function; and updating the accounting of charges to the external device to include a charge for performing the specified print function and an additional charge for applying the specified configuration settings.

20. The method of claim 16, further comprising:
receiving a command from a requesting device external to the multi-function apparatus to perform a specific function with specified configuration settings different from default settings for the specific function;
activating corresponding software to configure corresponding operation units for the specific function, based on the specified configuration settings, and performing the specific function; and
updating the accounting of charges to the external device to include a charge for performing the specific function and an additional charge for applying the specified configuration settings.

* * * * *